(12) United States Patent
Murakami et al.

(10) Patent No.: US 9,694,567 B2
(45) Date of Patent: Jul. 4, 2017

(54) FLUID DYNAMIC BEARING APPARATUS AND MOTOR COMPRISING THE SAME

(71) Applicants: Kazutoyo Murakami, Kuwana (JP); Masaki Egami, Kuwana (JP)

(72) Inventors: Kazutoyo Murakami, Kuwana (JP); Masaki Egami, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/495,538

(22) Filed: Sep. 24, 2014

(65) Prior Publication Data

US 2015/0007937 A1 Jan. 8, 2015

Related U.S. Application Data

(63) Continuation of application No. 11/915,490, filed as application No. PCT/JP2006/307652 on Apr. 11, 2006, now abandoned.

(30) Foreign Application Priority Data

May 24, 2005 (JP) ................................. 2005-151617

(51) Int. Cl.
*B32B 37/14* (2006.01)
*F16C 17/10* (2006.01)
(Continued)

(52) U.S. Cl.
CPC ............ *B32B 37/144* (2013.01); *B32B 37/12* (2013.01); *F16C 17/107* (2013.01);
(Continued)

(58) Field of Classification Search
CPC .. F16C 17/107; F16C 33/107; F16C 2370/12; F16C 35/02; H02K 7/085; H02K 5/1675; H02K 5/1677; B32B 37/12; B32B 37/144
See application file for complete search history.

(56) References Cited

U.S. PATENT DOCUMENTS

| 4,713,703 A | 12/1987 | Asano |
|---|---|---|
| 4,908,402 A | 3/1990 | Sasaki et al. |

(Continued)

FOREIGN PATENT DOCUMENTS

| DE | 36 89 772 B1 | 10/1994 |
|---|---|---|
| EP | 0 253 892 A1 | 1/1998 |

(Continued)

OTHER PUBLICATIONS

International Search Report of PCT/JP2006/307652, date of mailing May 23, 2006.

(Continued)

*Primary Examiner* — Jonathan Masinick
(74) *Attorney, Agent, or Firm* — Westerman, Hattori, Daniels & Adrian, LLP

(57) ABSTRACT

A fluid dynamic bearing apparatus with an increased adhesive strength between a component having an adhesion fixing face and a bracket is provided by appropriately controlling the adhesion gap. Materials for a bracket and a housing are selected so that the value obtained by dividing the linear expansion coefficient of the housing fixed to the inner periphery of the bracket by the linear expansion coefficient of the bracket having a portion for mounting a stator coil of a motor is not lower than 0.5 but not higher than 2.0. An adhesion fixing face formed on the outer periphery of the housing is adhesively fixed to the inner circumferential surface of the bracket with an anaerobic adhesive or an epoxy-based adhesive.

3 Claims, 7 Drawing Sheets

(51) Int. Cl.
*F16C 33/10* (2006.01)
*H02K 7/08* (2006.01)
*B32B 37/12* (2006.01)

(52) U.S. Cl.
CPC ........... *F16C 33/107* (2013.01); *H02K 7/085* (2013.01); *B32B 2037/1253* (2013.01); *B32B 2311/00* (2013.01); *B32B 2386/00* (2013.01); *B32B 2457/00* (2013.01)

(56) References Cited

U.S. PATENT DOCUMENTS

| | | | |
|---|---|---|---|
| 5,945,752 | A | 8/1999 | Ishizuka |
| 6,390,681 | B1 | 5/2002 | Nakazeki et al. |
| 6,431,757 | B1 | 8/2002 | Nakazeki et al. |
| 6,513,979 | B2 | 2/2003 | Mori et al. |
| 7,147,376 | B2 | 12/2006 | Shimizu et al. |
| 7,267,484 | B2 | 9/2007 | Satoji et al. |
| 7,431,505 | B2 | 10/2008 | Shibahara et al. |
| 7,625,124 | B2 | 12/2009 | Satoji et al. |
| 7,650,697 | B2 | 1/2010 | Gomyo et al. |
| 7,690,845 | B2 | 4/2010 | Satoji et al. |
| 7,798,721 | B2 | 9/2010 | Shibahara et al. |
| 2003/0169952 | A1 | 9/2003 | Yamashita et al. |
| 2004/0264817 | A1 | 12/2004 | Satoji et al. |
| 2005/0127782 | A1 | 6/2005 | Endo et al. |
| 2006/0018576 | A1 | 1/2006 | Kusaka et al. |
| 2006/0045395 | A1 | 3/2006 | Shimazu et al. |

FOREIGN PATENT DOCUMENTS

| | | |
|---|---|---|
| JP | 6469657 A | 3/1989 |
| JP | 10243605 A | 9/1998 |
| JP | 11191234 A | 7/1999 |
| JP | 200291648 A | 10/2000 |
| JP | 2003214432 A | 7/2003 |
| JP | 200590582 A | 4/2005 |
| JP | 2005106289 A | 4/2005 |
| JP | 2005114164 A | 4/2005 |
| NO | 2003-239951 A | 8/2003 |

OTHER PUBLICATIONS

Office Action dated Nov. 19, 2015, issued in counterpart German Patent Application No. 112006001324.6. (12 pages).

FIG. 8

| Name | Ratios of constituents of material used for example products and comparative product, vol. % | | | | | | | |
|---|---|---|---|---|---|---|---|---|
| | 1 | 2 | 3 | 4 | 5 | 6 | 7 | 8 |
| Stainless steel A | 100 | | | | | | | |
| Stainless steel B | | 100 | | | | | | |
| Brass | | | 100 | | | | | |
| Aluminium die cast | | | | 100 | | | | |
| Aluminium | | | | | 100 | | | |
| Linear PPS | | | | | | 50 | 60 | 70 |
| PAN-based carbon fiber | | | | | | 30 | 20 | 10 |
| Carbon black | | | | | | 5 | 5 | 5 |
| Inorganic compound | | | | | | 15 | 15 | 15 |
| Linear expansion coefficient, $10^{-5}/°C$ | 1.05 | 1.71 | 1.85 | 0.13 | 2.35 | 2.06 | 2.97 | 4.02 |

FIG. 9

| Item | Example products | | | | | | | |
|---|---|---|---|---|---|---|---|---|
| | 1 | 2 | 3 | 4 | 5 | 6 | 7 | 8 |
| Composition No. of housing simulating test piece | 1 | 4 | 7 | 3 | 8 | 7 | 7 | 7 |
| Composition No. of bracket simulating test piece | 1 | 4 | 7 | 7 | 4 | 3 | 4 | 5 |
| (0) Ratio of linear expansion coefficients | 1.000 | 1.000 | 1.000 | 0.623 | 1.887 | 1.605 | 1.394 | 1.264 |
| (1) Presence or absence of ion elution | Good | Good | Good | Good | Good | Good | Good | Good |
| Judgement | Good | Good | Good | Good | Good | Good | Good | Good |
| (2) Volume resistivity, Ω·cm | <10⁹ | <10⁹ | <10⁹ | <10⁹ | 5.8×10⁴ | <10⁹ | <10⁹ | <10⁹ |
| Judgement | Good | Good | Good | Good | Good | Good | Good | Good |
| (3) Ring abrasion depth, μm | 1.2 | 2.2 | 2.2 | 2.5 | 2.3 | 2.2 | 2.2 | 2.2 |
| (4) Abrasion depth of contacting material, μm | 1.3 | 1.8 | 0.1 | 0.9 | 0.1 | 0.1 | 0.1 | 0.1 |
| Judgement | Good | Good | Good | Good | Good | Good | Good | Good |
| (5) Adhesive strength, N | 4437 | 4568 | 4870 | 6879 | 3067 | 4165 | 3887 | 4140 |
| Judgement | Good | Good | Good | Good | Good | Good | Good | Good |
| Total judgement | Good | Good | Good | Good | Good | Good | Good | Good |

FIG. 10

| Item | Comparative example products | | | |
|---|---|---|---|---|
| | 1 | 2 | 3 | 4 |
| Composition No. of housing simulating test piece | 1 | 2 | 8 | 8 |
| Composition No. of bracket simulating test piece | 8 | 8 | 3 | 1 |
| (0) Ratio of linear expansion coefficients | 0.261 | 0.460 | 2.173 | 3.829 |
| (1) Presence or absence of ion elution Judgement | Good | Good | Good | Good |
| (2) Volume resistivity, O·cm | $<10^0$ | $<10^0$ | $<10^0$ | $<10^0$ |
| Judgement | Good | Good | Good | Good |
| (3) Ring abrasion depth, $\mu$m | 1.2 | 2.5 | 2.2 | 2.2 |
| (4) Abrasion depth of contacting material, $\mu$m | 1.3 | 0.9 | 0.1 | 0.1 |
| Judgement | Good | Good | Good | Good |
| (5) Adhesive strength, N | 776 | 913 | 825 | 205 |
| Judgement | Poor | Poor | Poor | Poor |
| Total judgement | Poor | Poor | Poor | Poor |

FLUID DYNAMIC BEARING APPARATUS AND MOTOR COMPRISING THE SAME

CROSS-REFERENCE TO RELATED APPLICATIONS

This application is a Continuation of U.S. application Ser. No. 11/915,490, filed Feb. 20, 2009, and wherein application Ser. No. 11/915,490 is a national stage application filed under 35 USC §371 of International Application No. PCT/JP2006/307652, filed Apr. 11, 2006, and which is based upon and claims the benefit of priority from the prior Japanese Patent Application No. 2005151617, filed on May 24, 2005, the entire contents of which are incorporated herein by reference.

FIELD OF THE INVENTION

The present invention relates to a fluid dynamic bearing apparatus which supports a rotational member by a fluid membrane formed in a bearing gap and a motor comprising the same. Bearing apparatuses of this type can be suitably used for information appliances, for example, in spindle motors for magnetic disk drive units such as HDD, optical disk drive units such as CD-ROM, CD-R/RW, DVD-ROM/RAM, magneto-optic disk drive units such as MD and MO, polygon scanner motors of laser beam printers (LBP), collar wheels of projectors, or electrical machinery and apparatuses, for example, small motors such as axial fans.

DESCRIPTION OF THE RELATED ART

Enhanced speed, cost reduction, noise reduction, etc., as well as high rotational accuracy, are required for the above various kinds of motors. One of the components which determine these required performances is a bearing which supports spindles of said motors. In recent years, the use of a fluid dynamic bearing having excellent characteristics for the above required performance has been considered or actually used.

Fluid dynamic bearings of this type are roughly classified into: hydrodynamic bearings comprising a hydrodynamic pressure producing part for producing hydrodynamic pressure in a lubricating fluid within a bearing gap; and so-called cylindrical bearings (bearings having a bearing cross section in a perfect circle shape) without a hydrodynamic pressure producing part.

For example, in a fluid dynamic bearing apparatus integrated into a spindle motor of HDD and like disk drive units, a radial bearing portion which supports a shaft member in the radial direction and a thrust bearing portion which supports the shaft member in the thrust direction are both sometimes constituted by hydrodynamic bearings. An example of known radial bearing portions in fluid dynamic bearing apparatuses (hydrodynamic bearing apparatuses) of this type is such that hydrodynamic grooves are formed as a hydrodynamic pressure producing part on either the inner circumferential surface of a bearing member (when the bearing member comprises a housing and a bearing sleeve, the inner circumferential surface of the bearing sleeve) or the outer circumferential surface of a shaft member opposing this and a radial bearing gap is formed between both faces. (For example, refer to Japanese Unexamined Patent Publication No. 2003-239951).

SUMMARY OF THE INVENTION

When a fluid dynamic bearing apparatus having the constitution described above is used by being integrated into, for example, a spindle motor for magnetic disk apparatuses such as HDD, mounting of the fluid dynamic bearing apparatus onto a motor is normally carried out by adhesively fixing the outer circumferential surface of the housing on the inner periphery face of a bracket having a portion for mounting a stator coil. Although no problem is caused when high adhesive strength can be ensured between the housing and the bracket, when the adhesive strength is insufficient, an adhesion surface is peeled off by the impact caused by a drop of an information appliance integrating a magnetic disk apparatus, which may result in lowered function of the fluid dynamic bearing apparatus and thus of the magnetic disk apparatus. Therefore, high adhesive force is required between such a housing and bracket. Particularly recently, in response to an increase in required disk capacities, the number of magnetic disks integrated into the above disk apparatus tends to increase. This further increases the impact force caused when dropped. Therefore, even higher adhesive force is required between the housing and bracket mentioned above.

Adhesives used in adhesive fixing of this type are often anaerobic adhesives and epoxy-based adhesives from the standpoint of workability, outgassing characteristics and the like. Normally, curing of these adhesives involves a heating process after application. Therefore, a diametrical gap (adhesion gap) between the housing and bracket where the adhesives are provided changes because of the thermal expansion of the two components during the curing step. The adhesion gap of this type is desirably set to have a predetermined width depending on the necessity, but when the adhesives are cured with heating, they are cured in a state that the adhesion gap between the two components changes during heating. Therefore, adhesion is carried out with the width of the adhesion gap different from that before the heating. Such a situation may prevent obtaining sufficient adhesive strength between the two components even if the width of the above adhesion gap is appropriately set in advance.

An object of the present invention is to provide a fluid dynamic bearing apparatus with an increased adhesive strength between a component having an adhesion fixing face and a bracket by appropriately controlling an adhesion gap.

To achieve the object mentioned above, the present invention provides a fluid dynamic bearing apparatus comprising a shaft member, a bracket, a radial bearing portion which rotatably supports the shaft member in the radial direction by a fluid membrane formed in a radial bearing gap, and an adhesion fixing face which is adhesively fixed to the inner circumferential surface of the bracket, wherein the value obtained by dividing the linear expansion coefficient of the component having the adhesion fixing face by the linear expansion coefficient of the bracket is not lower than 0.5 but not higher than 2.0.

As mentioned above, the present invention is made by focusing on the variation in the adhesion gap associated with the thermal expansion of the component having the adhesion fixing face and the bracket, and is characterized in that the value obtained by dividing the linear expansion coefficient of the component having the adhesion fixing face by the linear expansion coefficient of the bracket is not lower than 0.5 but not higher than 2.0. Such a constitution achieves the adhesive fixing between the component having the adhesion fixing face and the bracket in a state that a variation in the adhesion gap associated with heating is minimized to such a degree that the curing of adhesives is not adversely affected. Therefore, even when an adhesive which is cured with heating is used, high adhesive strength can be obtained between the component having the adhesion fixing face and the bracket, and the demand for increased disk capacities of the disk apparatuses can be met.

Herein, the reason why the ratio of the linear expansion coefficients of the two components {(the linear expansion coefficient of the component having the adhesion fixing face)/(the linear expansion coefficient of the bracket)} is defined to fall within the above range is as follows: when the above ratio of linear expansion coefficients is higher than 2.0, the adhesion gap becomes to narrow during heating of the adhesive, and in some cases it becomes a negative gap, whereby uncured adhesive may be squeezed out from the adhesion gap and the adhesive may fall short. Moreover, if the above ratio of the linear expansion coefficients is lower than 0.5 and the adhesion gap thereby becomes too wide, the adhesive strength may be lowered.

As adhesives used for adhesively fixing the component having the adhesion fixing face and the bracket, anaerobic adhesives, ultraviolet curable adhesive, and epoxy-based adhesives are suitable in terms of workability, in particular curing speed and outgassing characteristics.

As long as the ratio of the linear expansion coefficients (not lower than 0.5 but not higher than 2.0) falls within the above-mentioned range, either or both of the components having the adhesion fixing face and the bracket can be formed from a metallic material. Alternatively, either or both of the two components can be also formed from a resin composition.

In case of the latter, examples of base resins constituting the resin composition include polyphenylene sulfide (PPS) which has excellent characteristics required for the component having the adhesion fixing face, for example, oil resistance, moldability (fluidity during molding), outgassing characteristics and other properties. Moreover, in addition to the base resin, either or both of carbon fiber and an inorganic compound can be added to the resin composition as a filler, whereby the linear expansion coefficient of the resin composition can be controlled.

The amount of sodium (Na) contained in the resin composition having the above constitution is preferably 2000 parts per million (ppm) or lower. This can accordingly reduce the amount of Na ion elution into the lubricating oil, and the cleanliness of the inside and outside of the bearing can be maintained at a high level. Moreover, among polyphenylene sulfides (PPS), linear polyphenylene sulfide (PPS) having the smallest number of side chains is preferable in that the number of molecular terminal groups per unit volume is less and the amount of Na contained is less.

As carbon fiber, those having a tensile strength of 3000 MPa or higher are preferred. Examples of those having high conductivity as well as high strength include PAN-based (polyacrylonitrile-based) carbon fibers.

The strengthening effect, dimension stabilizing effect, electrostatic removal effect and other effects produced by the addition of these carbon fibers to the resin composition can be demonstrated more noticeably by considering the aspect ratio of the carbon fibers. That is, the more the fiber length of the carbon fibers, the higher the strengthening effect and electrostatic removal effect, and the smaller the fiber diameter, the higher the wear resistance, in particular, the less the damage of the sliding contacting material. From these perspectives, the aspect ratio of the carbon fibers is preferably 6.5 or higher specifically.

Moreover, the amount of the carbon fibers contained in the resin composition is preferably 10 to 35 vol. % so that the additional effects (strengthening effect, improved conductivity, improved dimensional stability) produced by adding the above carbon fibers can be demonstrated sufficiently and at the same time the fluidity (low melt viscosity) as a resin composition can be ensured.

As an inorganic compound for filling the above resin composition, inorganic compounds with a small amount of ion elution can be suitably used. Inorganic compounds of this type can suppress the ion elution into the lubricating oil, which can be hazardous, to a low level, and therefore the degeneration, deterioration and a decrease in the viscosity of the lubricating oil can be avoided, maintaining the bearing performance at a high level. Alternatively, the situation that the aforementioned ions are deposited on the bearing apparatus and its surroundings can be avoided and the cleanliness of the inside of the bearing or around the bearing apparatus can be ensured.

Specific examples of inorganic compounds which meet the above condition include aluminum borate compounds, titanium oxides, zinc oxides and the like. Among these, aluminum borate compounds can be especially preferably used. Moreover, some of these inorganic compounds are fibrous or powdery, and considering the strengthening effect on the housing, fibrous, in particular whiskered ones are preferred.

Another possible fluid dynamic bearing apparatus having the constitution described above is such that further comprises, in addition to the shaft member and bracket, a bearing sleeve whose inner circumferential surface forms a radial bearing gap between itself and the outer circumferential surface of the shaft member, and a housing in which the bearing sleeve is fixed on its inner periphery and an adhesion fixing face is formed on its outer periphery. In this case, the above component having the adhesion fixing face corresponds to the housing.

Alternatively, another possible bearing apparatus is such that further comprises, in addition to the shaft member and bracket, a bearing member whose inner circumferential surface forms a radial bearing gap between itself and the outer circumferential surface of the shaft member and in which an adhesion fixing face is formed on its outer circumferential surface. In this case, the above component having the adhesion fixing face corresponds to the bearing member.

The fluid dynamic bearing apparatus having the constitution described above can be suitably provided as a motor comprising this fluid dynamic bearing apparatus, a stator coil, and a rotor magnet which generates excitation between itself and the stator coil.

As mentioned above, according to the present invention, a fluid dynamic bearing apparatus with an increased adhesive strength between a component having an adhesion fixing face and a bracket can be provided by appropriately controlling the adhesion gap.

DESCRIPTION OF THE PREFERRED EMBODIMENTS

A first embodiment of the present invention will be described below with reference to FIGS. 1 to 4.

FIG. 1 conceptually shows a constitutional example of a spindle motor for information appliances which integrates a fluid dynamic bearing apparatus 1 according to the first embodiment of the present invention. This spindle motor is for use in disk drive units such as HDD, and comprises the fluid dynamic bearing apparatus (hydrodynamic bearing apparatus) 1 which rotatably supports a rotational member 3 comprising a shaft 2 in a non-contact manner, stator coils 4 opposing each other, for example, across a gap in the radial direction, and a rotor magnet. The stator coils 4 are attached to coil mounting portions 6b of a bracket 6 described later, and the rotor magnet 5 is attached to the outer periphery of the rotational member 3. A housing 7 of the fluid dynamic bearing apparatus 1 is fixed to the inner periphery of the bracket 6. Although not illustrated, one or more disk-shaped information recording media (hereinafter simply referred to as disks.) such as magnetic disks are retained on the rotational member 3. In the thus-constituted spindle motor, when the stator coils 4 are energized, the rotor magnet 5 is rotated by the excitation generated between the stator coils 4 and rotor magnet 5, whereby the rotational member 3 and the disks retained on the rotational member 3 rotate with the shaft 2.

FIG. 2 shows the fluid dynamic bearing apparatus 1. This fluid dynamic bearing apparatus 1 mainly comprises the bracket 6, the housing 7 fixed to the inner periphery of the bracket 6, a bearing sleeve 8 fixed on the housing 7, and the rotational member 3 which rotates relative to the housing 7 and bearing sleeve 8. In this embodiment, the rotational member 3 corresponds to the shaft member. For the sake of explanation, among the opening portions of the housing 7 formed on both of its axial ends, the side sealed with the lid member 10 is referred to as the lower side, while the side opposite to the sealed side is referred as the topside in the description below.

The rotational member 3 comprises, for example, a hub portion 9 disposed on the opening side of the housing 7 and the shaft 2 inserted at the inner periphery of the bearing sleeve 8.

The hub portion 9 is formed from a metal or a resin, and is constituted of a disk portion 9a covering the opening side of the housing 7 (topside), a cylindrical portion 9b extending downwardly from the outer circumference of the disk portion 9a in the axial direction, and a disk loading face 9c and brim 9d which are provided on the outer periphery of the cylindrical portion 9b. The disks (not shown) are fitted onto the outer periphery of the disk portion 9a, and are mounted on the disk loading face 9c. The disks are retained on the hub portion 9 by an appropriate retaining means (ex., clamper), which is not illustrated.

The shaft 2 is formed integrally with the hub portion 9 in this embodiment, and comprises a flange portion 2b separately as slip-off prevention (preventive) at its lower end. The flange portion 2b is made of a metal, and is fixed to the shaft 2, for example, by a means such as screw connection.

The bearing sleeve 8 can be formed from, for example, a metal including a copper alloy such as brass and aluminum alloy, and can be also formed from a porous body comprising a sintered metal. In this embodiment, it is cylindrically formed from a porous body of a sintered metal comprising copper as a main ingredient.

A region in which a plurality of hydrodynamic grooves are arranged is formed on the entire or a part of the cylindrical region of the inner circumferential surface 8a of the bearing sleeve 8 as a radial hydrodynamic pressure producing part. In this embodiment, for example, as shown in FIG. 3, two regions in which a plurality of hydrodynamic grooves 8a1, 8a2 are arranged in a herringbone shape are formed separately in the axial direction.

On the entire or a part of the annular region of the lower end face 8c of the bearing sleeve 8, for example, a region in which a plurality of hydrodynamic grooves are arranged in a spiral shape is formed as a thrust hydrodynamic pressure producing part, although not illustrated in the FIG. This region in which hydrodynamic grooves are formed opposes the upper end face 2b1 of the flange portion 2b as a thrust bearing face, and forms a thrust bearing gap of a second thrust bearing portion T2 between itself and the upper end face 2b1 during rotation of the shaft 2 (rotational member 3) (refer to FIG. 2).

The housing is cylindrically formed from a resin. In this embodiment, the housing 7 has such a configuration that both of its axial ends are open, and the other axial end side is sealed with a lid member 10. A thrust bearing face 7a is provided on the entire or a part of the annular region of the end face (upper end face) of one end side. In this embodiment, for example, as shown in FIG. 4, a region in which a plurality of hydrodynamic grooves 7a1 are arranged in a spiral shape is formed on the thrust bearing face 7a as a thrust hydrodynamic pressure producing part. This thrust bearing face 7a (region in which hydrodynamic grooves 7a1 are formed) opposes a lower end face 9a1 of the disk portion 9a of the hub portion 9, and while the rotational member 3 is in rotation, it forms a thrust bearing gap of the first thrust bearing portion T1 described later between itself and the lower end face 9a1 (refer to FIG. 2).

The lid member 10 sealing the other end side of the housing 7 is formed from a metal or a resin, and is fixed to a shoulder 7b provided on the inner periphery side at the other end of the housing 7. Herein, the fixing means is particularly limited, and, for example, means such as adhesion (including loose adhesion, press fitting adhesion), press fitting, deposition (for example, ultrasonic deposition), welding (for example, laser welding) can be suitably selected depending on the combination of materials, required mounting strength, sealing performance and other conditions.

On the inner circumferential surface 7c of the housing 7, the outer circumferential surface 8b of the bearing sleeve 8 is fixed by a suitable means such as, for example, adhesion (including loose adhesion and press fitting adhesion), press fitting, deposition and the like.

A tapered sealing face 7d whose diameter gradually increases toward the top is formed on the outer periphery of the housing 7. This tapered sealing face 7d forms an annular sealing space S whose radial dimension gradually decreases from the sealed side (the bottom) of the housing 7 toward the opening side (the top) between itself and the inner circumferential surface 9b1 of the cylindrical portion 9b. This sealing space S is in communication with the outer diameter side of the thrust bearing gap of the first thrust bearing portion T1 while the shaft 2 and the hub portion 9 are in rotation.

An adhesion fixing face 7e is formed at the lower end of the outer periphery of the housing 7. The adhesion fixing face 7e has a cylindrical shape with a constant diameter in this embodiment, and is fixed to the inner circumferential surface 6a of the bracket 6 with an adhesive (refer to FIG. 2).

At this time, in adhesive fixing between the inner circumferential surface 6a and the adhesion fixing face 7e, for example, ultraviolet curable adhesives, anaerobic adhesives or epoxy-based adhesives are used in term of workability, in particular curing speed and outgassing characteristics. Specific examples of ultraviolet curable adhesives include 3000 series manufactured by Three Bond Co., Ltd. Examples of anaerobic adhesives include 1300 series also manufactured by Three Bond Co., Ltd. Examples of epoxy-based adhesives include 2200 series also manufactured by Three Bond Co., Ltd. Moreover, materials for forming the housing 7 and bracket 6 are selected so that the value obtained by dividing the linear expansion coefficient of the housing 7 by the linear expansion coefficient of the bracket 6 is not lower than 0.5 but not higher than 2.0.

In such a manner, by setting the ratio of the linear expansion coefficients of the two components 6, 7 {(the linear expansion coefficient of the housing 7)/(the linear expansion coefficient of the bracket 6)} to fall within the above range, adhesive fixing of the housing 7 and the bracket 6 can be carried out in a state that a variation in the diametrical gap (adhesion gap) between the inner circumferential surface 6a and the adhesion fixing face 7e during heating, is suppressed to such a range that does not adversely affect the curing of the adhesive. Therefore, as mentioned above, even when an adhesive which is cured with heating is used, high adhesive strength can be obtained between the housing 7 and the bracket 6.

When the adhesives stated above, for example, anaerobic adhesives, are used, the value of the adhesion gap between the two components 6, 7 before heating is generally 10 μm to 100 μm in the diametrical gap. Considering improvement in the fixing accuracy between the two components 6, 7 after being cured and stabilization of the adhesive strength, the above adhesion gap is suitably 20 μm to 40 μm in the diametrical gap.

As long as the ratio of the linear expansion coefficients falls within the above range, the materials of the bracket 6 and the housing 7 can be optionally selected, and, it is possible to form, for example, the bracket 6 of a metal such as stainless steel, and the housing 7 of a resin composition comprising a crystalline resin such as LCP, PPS and PEEK as a base resin.

Among these, high oil resistance (low oil absorbing property) to the above-mentioned ester-based lubricating oil during use is required for materials of the housing 7. It is also necessary to suppress the amount of outgas generated and the amount of water absorbed during use. Moreover, considering a change in temperature in the used atmosphere, high heat resistance is also required.

As long as the base resins (crystalline resins such as LCP, PPS, PEEK) shown above as examples are used, the housing 7 which is excellent in all of the oil resistance, outgassing property, water absorbing property and heat resistance mentioned above can be formed. Moreover, among the above crystalline resins, polyphenylene sulfide (PPS) is available at less cost compared to other resins and is excellent in fluidity during molding (melt viscosity). Therefore, it is especially suitable as a base resin for the housing 7 of this type.

Polyphenylene sulfide (PPS) is generally produced by the polycondensation reaction of sodium sulfide and paradichlorobenzene, and simultaneously contains a by-product, sodium chloride. Accordingly, it is necessary to use an appropriate solvent to clean polyphenylene sulfide (PPS). Any solvent may be used for cleaning as long as it has a relative dielectric constant of 10 or higher, preferably 20 or higher, and more preferably 50 or higher. Taking environmental aspects into consideration, for example, water (relative dielectric constant: about 80) is preferable, and in particular ultrapure water is preferable. Na in the terminal groups in polyphenylene sulfide (PPS) is mainly removed by conducing cleaning with such a solvent. Therefore, the amount of Na contained in polyphenylene sulfide (PPS) can be reduced (for example, 2000 ppm or lower), which renders polyphenylene sulfide (PPS) usable as a resin material for forming the housing 7. Moreover, removing Na in the terminal groups is also advantageous in that the crystallization speed is increased.

Polyphenylene sulfide (PPS) is roughly categorized into three groups: crosslinked polyphenylene sulfide (PPS); semilinear polyphenylene sulfide (PPS) with fewer side chains; and linear polyphenylene sulfide (PPS) with fewer side chains. Among these, linear polyphenylene sulfide (PPS) with fewer side chains is preferred in that it has fewer molecular terminal groups per molecule and therefore the amount of Na contained is less. Moreover, linear polyphenylene sulfide (PPS) is also preferable in that it is easy to clean than other types of polyphenylene sulfide (PPS) or it is almost unnecessary to reduce the amount of Na contained by cleaning. Specifically, those having the amount of Na contained of 2000 ppm or lower, more preferably 1000 ppm, and even more preferably 500 ppm or lower correspond to linear polyphenylene sulfide (PPS). According to this, the amount of Na ion elution into the lubricating oil can be suppressed and Na deposition on the disks retained on the fluid dynamic bearing apparatus 1 and the rotational member 3 or the surface of a disk head (not shown) can be prevented.

One or both of carbon fiber and an inorganic compound can be added to the above base resin as fillers. The filler functions to adjust the linear expansion coefficient of the formed housing 7 with these base resins and resin compositions containing fillers by changing the amount to be added to the base resin.

Moreover, the addition of carbon fiber as a filler can greatly strengthen the housing 7 and suppress the dimensional change associated with a change in temperature of the housing 7 so that high dimensional stability can be obtained. This enables forming the hydrodynamic groove 7a1 of the thrust bearing face 7a highly accurately, and controlling the thrust bearing gap of the first thrust bearing portion T1 during use highly accurately. Moreover, high conductivity is demonstrated of the carbon fiber by adding carbon fiber to the base resin, and therefore sufficient conductivity (for example, volume resistivity: $1.0 \times 10^6 \Omega \cdot cm$ or lower) can be imparted to the housing 7. Accordingly, the static electricity which has accumulated in the disks during use can be dissipated to ground side members (bracket 6, etc.) through the rotational member 3 and housing 7 (further through the bearing sleeve 8 in some cases).

As the carbon fiber, for example, PAN-based, pitch-based and various other carbon fibers are usable. From the perspective of the strengthening effect and impact absorbing ability, those having relatively high tensile strength (preferably 3000 MPa or higher) are preferable, and PAN-based carbon fibers are preferable as those also having especially high conductively.

As the carbon fibers mentioned above, those which are in the dimension range described below can be used.

(1) When a molten resin is kneaded and injection-molded, the carbon fibers are cut and their fiber lengths become shorter. When the shortening of the fiber length proceeds, decreases in the strength, conductivity and other properties become noticeable, and satisfying these required characteristics becomes difficult. Therefore, the carbon fibers added to the resin are preferably rather long fibers in anticipation of breakage of the fibers during molding, and specifically carbon fibers having an average fiber length of 100 μm or more, and more preferably 1 mm or more are desirably used.

(2) In contrast, in the injection molding step, the resin cured within the mold is sometimes withdrawn, fused again, and is kneaded with a virgin resin composition to be reused (recycled). In this case, since part of the fibers are repeatedly recycled, when the initial fiber length is too long, the fibers become significantly shorter than their initial fiber lengths because of the cutting associated with the recycling, and changes in the characteristics of the resin composition (lowered melt viscosity, etc.) become noticeable. To minimize such changes in the characteristics, the shorter the fiber length, the better. More specifically, it is desirable to set the average fiber length to 500 µm or less (preferably 300 µm or less).

The selection of the fiber length of the carbon fibers mentioned above can be determined by the kind of history of the resin composition used in the actual injection molding step. For example, when only the virgin resin composition is used, or when a mixture of the virgin resin composition and recycled resin compositions are used and the ratio of the virgin resin composition is large, from the perspective of inhibiting decreases in the strength, conductively and other properties, it is preferable to use carbon fibers within the dimension range mentioned in the above (1). Contrarily, when the ratio of the recycled resin compositions is large, from the perspective of inhibiting changes in the characteristics of the resin composition associated with the recycling, it is desirable to use carbon fibers within the dimension range mentioned in the above (2).

Whichever the carbon fibers (1) and (2) is used, the smaller the fiber diameter of the carbon fibers, the more the number of the fibers used, which is effective for making the product quality uniform. In addition, the higher its aspect ratio, the higher the strengthening effect due to the fiber reinforcement. Therefore, the higher the aspect ratio of the carbon fibers, the better. More specifically, an aspect ratio of 6.5 or higher is preferred. Moreover, taking the workability and availability into consideration, its average fiber diameter is suitably 5 to 20 µm.

To sufficiently demonstrate the strengthening effect and abrasion reducing effect, electrostatic removal and other effects produced by the carbon fibers stated above, the amount of the carbon fibers added to the base resin is desirably 10 to 35 vol. %, and more preferably 15 to 25 vol. %. This is because if the amount of the carbon fibers added is less than 10 vol. %, the strengthening effect and electrostatic removal effect produced by the carbon fibers are not sufficiently demonstrated and the wear resistance of the portion of the housing 7 which is slid against the hub portion 9, in particular the wear resistance of the hub portion 9 against which the housing 7 is slid, is not ensured. On the other hand, if the amount added is more than 35 vol. %, the moldability of the housing 7 is lowered, and high dimensional accuracy becomes difficult to obtain.

Various substances are usable as the inorganic compounds. Among these, inorganic compounds with a small amount of ion elution are especially preferred. As long as the inorganic compounds used are of this type, ion elution which can be a hazardous substance into the lubricating oil can be suppressed and the bearing performance can be maintained at a high level. Alternatively, the situation that the ions stated above are deposited on the bearing apparatus and its surroundings can be avoided so that the cleanliness inside the bearing or around the bearing apparatus can be ensured.

Specific examples of inorganic compounds which meet the above conditions include aluminum borate compounds, titanium oxides, zinc oxides and the like. Among these, aluminum borate compounds can be especially preferably used. Some of these inorganic compounds are fibrous or powdery. Among these, fibrous one, in particular whiskered ones, are preferable considering the strengthening effect on the housing, while powdery ones are preferred considering the moldability (resin filling capability) of the housing.

The melt viscosity of the resin composition containing fillers such as carbon fibers and inorganic compounds added to the above base resin is preferably suppressed to 500 Pa·s or lower at a temperature of 310° C. and a shear rate of 1000 s-1 to highly accurately fill the inside of the cavity with the molten resin. Therefore, the melt viscosity of the base resin (PPS) is preferably 100 Pa·s or lower at a temperature of 310° C. and a shear rate of 1000 s-1 to compensate an increase in the viscosity of the resin composition.

As already stated, by selecting the materials of the bracket 6 and housing 7 so that the ratio of their linear expansion coefficients falls within the above-mentioned range, especially by forming the housing 7 from the resin composition stated above, the housing 7 having high adhesive strength with the bracket 6, high oil resistance, low outgassing property, high fluidity during molding, low water absorbing property and high heat resistance can be obtained. Therefore, the durability and reliability of the fluid dynamic bearing apparatus 1 and the disk drive unit integrating this bearing apparatus can be increased.

The inside of the fluid dynamic bearing apparatus 1 having the constitution described above is filled with the lubricating oil, and the oil level of the lubricating oil is always maintained within the sealing space S. Various substances can be used as the lubricating oil. Low evaporation rate and low viscosity are required especially for the lubricating oil provided to fluid dynamic bearing apparatuses for disk drive units such as HDD. For example, dioctyl sebacate (DOS), dioctyl azelate (DOZ) and like ester-based lubricating oils are suitable.

In the fluid dynamic bearing apparatus 1 having the constitution described above, during rotation of the shaft 2 (rotational member 3), two regions (upper and lower regions where the hydrodynamic grooves 8$a$1, 8$a$2 are formed) which serve as radial bearing faces of the inner circumferential surface 8$a$ of the bearing sleeve 8 oppose each other across the outer circumferential surface 2$a$ of the shaft 2 and the radial bearing gap. As the shaft 2 rotates, the lubricating oil of the above radial bearing gap is pushed to the side of the axial center of the hydrodynamic grooves 8$a$1, 8$a$2, and its pressure is increased. The first radial bearing portion R1 and the second radial bearing portion R2 which support the shaft 2 in the radial direction in a non-contact manner are constituted by such hydrodynamic effect of the hydrodynamic grooves 8$a$1, 8$a$2.

Simultaneously, an oil film of the lubricating oil is formed by the hydrodynamic effect of the hydrodynamic grooves in the thrust bearing gap between the thrust bearing face 7$a$ of the housing 7 (region in which hydrodynamic grooves 7$a$1 are formed) and the lower end face 9$a$1 of the hub portion 9 (disk portion 9$a$) opposing this, and the thrust bearing gap between the lower end face 8$c$ of the bearing sleeve 8 (region in which hydrodynamic grooves are formed) and the upper end face 2$b$1 of the flange portion 2$b$ opposing this, respectively. Furthermore, the first thrust bearing portion T1 and second thrust bearing portion T2 which support the rotational member 3 in the thrust direction in a non-contact manner are constituted by the pressure of these oil films.

The first embodiment of the present invention has been described above, but the present invention is not limited to this embodiment, and other constitutions may be also employed. Other constitutional examples of the fluid dynamic bearing apparatus will be described below. It should be noted that in the drawings shown below, the portions and components having the constitutions and functions same as in the first embodiment are referred to by the identical reference numerals, and repeated explanation will be omitted.

In the above first embodiment, the case where a thrust bearing face 7a in which a plurality of hydrodynamic grooves 7a1 are arranged on the upper end face of the housing 7 is provided (first thrust bearing portion T1) and a thrust bearing face in which a plurality of hydrodynamic grooves are arranged on the lower end face 8c of the bearing sleeve 8 is provided (second thrust bearing portion T2) is described, but the present invention can be also applied to a fluid dynamic bearing apparatus provided only with the first thrust bearing portion T1. In this case, although not illustrated, the shaft 2 has a straight configuration which does not have the flange portion 2b. Therefore, the housing 7 can be formed to have a bottomed cylindrical shape by using a lid member 10 as the bottom integrally from a resin material. Moreover, the shaft 2 and the hub portion 9 can be formed from a metal or a resin by integrally molding, or the shaft 2 can be formed separately from the hub portion 9. In this case, the shaft 2 can be made of a metal, and the rotational member 3 can be formed from a resin integrally with the hub portion 9 by using this shaft 2 made of a metal as an insert piece.

FIG. 5 shows a fluid dynamic bearing apparatus 11 according to a second embodiment of the present invention. In this embodiment, the shaft member 12 comprises a flange portion 12b provided integrally or separately at its lower end. Moreover, the housing 17 comprises a cylindrical side portion 17a, and a bottom 17b having a structure separate from the side portion 17a and positioned at the lower end portion of the side portion 17a. A sealing portion 13 protruding toward the inner periphery side is formed integrally with the housing 17 at the upper end portion of the side portion 17a of the housing 17. On the upper end face 17b1 of the bottom 17b of the housing 17, although not illustrated, for example, a region in which a plurality of hydrodynamic grooves are arranged in a spiral shape is formed. Moreover, during rotation of the shaft member 12, a first thrust bearing portion T11 is formed between the lower end face 8c of the bearing sleeve 8 and the upper end face 12b1 of the flange portion 12b of the shaft member 12, while a second thrust bearing portion T12 is formed between the upper end face 17b1 of the bottom 17b of the housing 17 and a lower end face 12b2 of the flange portion 12b.

In this embodiment, the outer circumferential surface 17c of the housing 17 serves as an adhesion fixing face which is adhesively fixed to the inner circumferential surface of the bracket (not illustrated). Therefore, if materials such that the ratio of their linear expansion coefficients is not lower than 0.5 but not higher than 2.0 are selected as the materials for forming this housing 17 and the bracket as in the above first embodiment, the housing 17 excellent in the adhesive strength with the bracket, oil resistance, wear resistance, cleanliness, moldability and other properties can be obtained.

FIG. 6 shows a fluid dynamic bearing apparatus 21 according to a third embodiment of the present invention. In this embodiment, a sealing portion 23 is formed separately from a side portion 27a of the housing 27, and is fixed to the inner periphery of the upper end portion of the housing 27 by adhesion, press fitting, deposition or other means. Moreover, a bottom 27b of the housing 27 is formed integrally with the side portion 27a of the housing 27, and is in the shape of a bottomed cylinder. Since the other constitutions than those mentioned above are similar to the second embodiment, their explanation is omitted.

Also in this embodiment, the outer circumferential surface 27c of the housing 27 serves as an adhesion fixing face which is adhesively fixed to the inner circumferential surface of the bracket (also not illustrated). Therefore, combinations of materials which meet the ratio of their linear expansion coefficients as in the above first embodiment are selected as the materials for forming the housing 27 and the bracket, whereby the housing 27 excellent in the adhesive strength with the bracket, oil resistance, wear resistance, cleanliness, moldability and other properties can be obtained.

In the embodiments (first to third embodiments) described above, the case where the adhesion fixing face 7e is provided on the housing 7 and a radial bearing gap is formed between the inner circumferential surface 8a of the bearing sleeve 8 and the outer circumferential surface 2a of the shaft 2, but these may be an integral article made from a single material (integration is also possible in the embodiments shown in FIGS. 5 and 6). FIG. 7 shows a fluid dynamic bearing apparatus 31 according to the fourth embodiment of the present invention, and the apparatus has a constitution different from the fluid dynamic bearing apparatuses according to the above first to third embodiments in that it comprises a bearing member 37 as an integral article. In this case, the bearing member 37 forms a radial bearing gap between its inner circumferential surface 37a and the outer circumferential surface 2a of the shaft 2, and has an adhesion fixing face 37e with the bracket 6 on its outer periphery. Furthermore, on the inner circumferential surface 37a which faces the radial bearing gap, For example, as shown in FIG. 3, a region (radial bearing face) in which the hydrodynamic grooves 8a1, 8a2 are formed is formed. Similarly, the end faces 37b, 37c of the bearing member 37 have the configurations corresponding to the thrust bearing faces 7a, 8c, respectively, shown in the first embodiment. Since the other constitutions than those mentioned above are similar to the first embodiment, their explanation is omitted.

Of course, the present invention can be applied not only to the form described above, but also to other components as long as they have the adhesion fixing face 7e with the bracket 6. Similarly, the present invention can be applied to the bracket 6 as long as it has a component having the adhesion fixing face 7e such as the housing 7 which is adhesively fixed to its inner periphery and is a component for fixing the fluid dynamic bearing apparatus 1 to a motor. Accordingly, the bracket 6 does not necessarily have the portion 6b for mounting the stator coil 4, and the present invention can be also applied, for example, by producing the bracket 6 separately from the base component of the motor and adhesively fixing this to the adhesion fixing face 7e when the fluid dynamic bearing apparatus 1 is fixed to the motor.

In the embodiments described above (first to fourth embodiments), when the housing 7 is formed from a resin composition, the case where fillers such as carbon fibers and inorganic compounds are added to a single kind of a base resin (polyphenylene sulfide) is described. However, other crystalline resins and noncrystalline resins, rubber components and like organic substances may be added unless they lower the effect of the present Invention. Moreover, in addition to the carbon fibers, metal fibers, glass fibers, whiskers and like inorganic substances may be added. For example, polytetrafluoroethylene (PTFE) can be added as a mold releasing agent having high oil resistance, and carbon black can be added as a conductive agent.

The case where the housing 7 is formed from a resin composition and the bracket 6 is formed from a metal is mainly described above, but, as mentioned above, other combinations are also possible as long as the ratio of their linear expansion coefficients falls within the above range (not lower than 0.5 but not higher than 2.0) (also applies to the combination of the bearing member 37 and the bracket 6). For example, the housing 7 and the bracket 6 can be both formed from resin compositions, and the two components 6 and 7 can be both formed from a metal. Alternatively, it is also possible to form the housing 7 from a metal and the bracket 6 from a resin composition. When the housing 7 is formed from a metal, examples of usable metallic materials include SUS420, SUJ2SUS304 and like stainless steel, so-called gunmetal and like copper alloys (bronze, brass, etc.) and aluminum materials (A5056, etc.).

In the embodiments described above, the constitution in which the hydrodynamic effect of the lubricating fluid is produced by the hydrodynamic grooves in a herringbone shape and a spiral shape is shown as examples of as the radial bearing portions R1, R2 and thrust bearing portions T1, T2, but the present invention is not limited to this.

For example, as the radial bearing portions R1, R2, although not illustrated, a so-called stepped hydrodynamic pressure producing part in which grooves in the axial direction are formed in a plurality of portions in the circumferential direction, or a so-called multilobe bearing in which a plurality of arcuate faces are arranged in the circumferential direction and a wedge-shaped radial gap (bearing gap) is formed between the arcuate faces and the outer circumferential surface 2a of the opposing shaft 2 (or the shaft member 12) may be employed.

Alternatively, a so-called circular bearing can be constituted by rendering the inner circumferential surface 8a of the bearing sleeve 8 which serves as the radial bearing face an inner circumferential surface in the shape of a perfect circle with no hydrodynamic grooves as the hydrodynamic pressure producing part or arcuate faces provided and using this inner circumferential surface and the opposing outer circumferential surface 2a of the shaft 2 in a perfect circle.

One or both of the thrust bearing portions T1, T2, although not illustrated, can be also constituted of a so-called step bearing in which a plurality of hydrodynamic grooves in the form of radial grooves are provided at predetermined intervals in the circumferential direction in the region which serves as the thrust bearing face, a wave bearing (in which steps are waves) or other bearings.

Moreover, in the embodiments described above, the case where the radial bearing face is formed on the side of the bearing sleeve 8 and the bearing member 37 and the thrust bearing faces 7a, 37b, 37c are formed on the side of the housing 7 and the bearing member 37 is described, but these bearing faces on which the hydrodynamic pressure producing parts are formed are not limited to the components on the fixed side. For example, they can be provided on the side of the shaft 2, flange portion 2b and hub portion 9 opposing these (rotation side).

Example

To reveal the advantages of the present invention, housing simulating test pieces and bracket simulating test pieces were prepared from a plurality of materials having different linear expansion coefficients, and the evaluation of the characteristics required for the housing for fluid dynamic bearing apparatuses, including the adhesive strength between the housing and bracket, was carried out. Five types of metallic materials and three types of resin compositions were used as the materials of the above test pieces. Linear polyphenylene sulfide (PPS) was used as a base resin of all the resin compositions. Moreover, a carbon fiber and an inorganic compound were used as fillers. The constitutional ratio and compounding ratio of the above materials are as shown in FIG. 8.

In this Example, two kinds of stainless steel (SUS420, SUS304), brass (CAC301), aluminum die cast (ADC12), and aluminum (A5056) were used as the five kinds of metallic materials (all of them are products compliant with JIS standard). Moreover, LC-5G manufactured by Dainippon Ink And Chemicals, Incorporated was used as linear polyphenylene sulfide (PPS); HM35-C6S (fiber diameter: 7 μm, average fiber length: 6 mm, tensile strength: 3240 MPa) manufactured by Toho Tenax Co., Ltd. was used as the carbon fiber (PAN-based); and Alborex (grade: Y, main constituent: aluminum borate, average diameter: 0.5 to 1.0 μm, average fiber length: 10 to 30 μm, form: whisker) manufactured by Shikoku Chemicals Corporation was used as the inorganic compound. Moreover, carbon black was added as an additive in this Example. More specifically, carbon black (grade: #3350B, average particle diameter: 24 nm) manufactured by Mitsubishi Chemical Corporation was used.

Moreover, among the ratios of constituents shown in FIG. 8, three types of resin compositions were prepared by temporarily forming them into pellets by the method described below, and producing test pieces described later using such pellets. The method of molding the pellets will be shown below. The above-mentioned base resin and filler which are dry-blended according to the compounding ratio shown in FIG. 8 were fed into a biaxial extruder (screw L/D ratio: about 30) with a side feed, and were fused and kneaded at a screw rotation speed of 150 rpm and at a temperature of 300 to 330° C. After the kneading, the molten strand was withdrawn through the holes of a die each having a diameter of 4 mm and cooled, thereby giving rice-sized pellets of the resin composition. To avoid breakage of the carbon fibers during the fusion-kneading as much as possible, the above blend was provided from the side feed portion of the biaxial extruder at a predetermined speed.

The evaluation items are the following six: (0) the ratio of the linear expansion coefficients, (1) insolubility of ions of the housing simulating test pieces, (2) volume resistivity [Ω·cm], (3) ring abrasion depth [μm], (4) abrasion depth of the sliding contacting material [μm], and (5) adhesive strength [N]. Among these, the evaluation test of (0) the ratio of the linear expansion coefficients and (5) adhesive strength were conducted on both the housing simulating test pieces and the bracket simulating test pieces, while the evaluation tests of (1) insolubility of ions to (4) abrasion depth of the sliding contacting material were conducted on the housing simulating test pieces. The evaluation method of each evaluation item (the method of measuring the value of the evaluation item) and the criteria for judging whether it is acceptable or not are as shown below.

(0) Ratio of the Linear Expansion Coefficients

The linear expansion coefficients of the materials of the ratios of constituents shown in FIG. 8 were determined by using a TMA (thermomechanical analyzer). A specific procedure is shown below. (a) Cup-shaped test pieces in the form of a bottomed cylinder (φ10 mm×φ8 mm×15 mm, thickness of the bottom: 2 mm) were prepared by using from materials having the ratios of constituents shown in FIG. 8. When the material is a metal, the test pieces having the above configuration were formed from a round bar by a lathe turning process. When the material is a resin composition, a pin gate was disposed on the outer surface side of the base plate portion to prepare test pieces having the above configuration by injection-molding. (b) The cup-shaped test pieces were set in the TMA. The test pieces which were difficult to set were used with both of their axial ends cut to have the shape of a ring. To correctly measure the amount of thermal expansion of the test pieces in the radial direction, the measurement direction of a measurement probe is made to coincide with the radial direction of the test pieces. (c) The amount of thermal expansion in the radial direction was determined under the following conditions: measurement load: 0.05 N, measurement temperature range: 23° C. to 100° C., programming rate: 5° C./min, and the atmosphere gas: nitrogen. It should be noted that the upper limit value of the measurement temperature range was set by taking the heat-curing condition (90° C.×1 h) of the adhesive described later into consideration. (d) The linear expansion coefficient of each material (ratio of chemical constituents No. 1 to 8) obtained in the above procedure is as shown in FIG. 8. Moreover, based on these results, the ratios of the linear expansion coefficients of each example product and comparative product shown in FIGS. 9 and 10 were calculated by the formula shown below.

Ratio of linear expansion coefficients [dimensionless]=(linear expansion coefficient of housing simulating test piece)/(linear expansion coefficient of bracket simulating test piece)

(1) Insolubility of Ions

The presence or absence of elution of various kinds of ions (including Na ions) from the cup-shaped test pieces formed from materials having the ratios of constituents shown in FIG. 8 were confirmed by using the ion chromatography. The specific procedure is shown below. (a) A predetermined amount of ultrapure water is poured into an empty beaker, and the above test piece whose surface has been sufficiently cleaned by ultrapure water in advance is placed into the beaker. (b) The above beaker is set in a constant temperature oven heated to 80° C. for one hour, and the ions contained the surface and inside of the test piece are eluted into ultrapure water. In contrast, a beaker into which no test piece is placed and only pure water is poured is similarly set in a constant temperature oven heated to 80° C. for one hour, and is used as a blank. (c) The amount of ions contained in ultrapure water into which the test piece obtained in the above is placed is determined by the ion chromatography (measurement value A). The amount of ions contained in the blank is determined in a similar manner separately (measurement value B). (d) The measurement value B is subtracted from the measurement value A to confirm the presence or absence of ion elution.

As the criteria for judging whether it is acceptable or not, the ions which can be analyzed with the column commonly used in the ion chromatography were used as detectable ions (refer to Table 1 below). A test piece was judged acceptable if the ion described in the table was not detected (Good), while it was judged unacceptable if such ion was detected (Poor).

TABLE 1

| List of ions to be detected | |
| --- | --- |
| Cation | Anion |
| $Li^+$ $Mg^{2+}$ | $F^-$ $NO_3^-$ |
| $Na^+$ $Ca^{2+}$ | $Cl^-$ $PO_4^{3-}$ |
| $K^+$ $Sr^{2+}$ | $NO_2^-$ $SO_4^{2-}$ |
| $Rb^+$ $Ba^{2+}$ | $Br^-$ |
| $Cs^+$ $NH_4^+$ | $SO_3^{2-}$ |

(2) Volume Resistivity [Ω·cm]

Measurement was carried out by the four probe method according to JIS K7194 using the test pieces formed from materials having the ratios of constituents shown in FIG. 8. As the criteria for judging whether it is acceptable or not, a value of $1.0 \times 10^6$ Ω·cm or lower was judged acceptable (Good), while a value higher than $1.0 \times 10^6$ Ω·cm was judged unacceptable (Poor).

(3) Ring Abrasion Depth [μm] and (4) Abrasion Depth of Sliding Contacting Material [μm]

Measurement was carried out by the ring-on-disk test in which the disk sides of the ring-shaped test pieces formed from materials having the ratios of constituents shown in FIG. 8 were rotated in a state that the test pieces were pushed against a disk-shaped sliding contacting material in the lubricating oil with a predetermined load. Specifically, ring-shaped test pieces sizing ϕ21 mm (outer diameter)×ϕ17 mm (inside diameter)×3 mm (thickness) were used. Moreover, a disk material manufactured by SUS420 having the surface roughness Ra of 0.04 μm and the size of ϕ30 mm (diameter)×5 mm (thickness) was used as the sliding contacting material. The lubricating oil used as diester oil was di(2-ethylhexyl)azelate. The dynamic viscosity of this lubricating oil at 40° C. is 10.7 mm²/s. During the ring-on-disk test, the contact pressure of the sliding contacting material against the test pieces was 0.25 MPa, the rotation speed (peripheral speed) was 1.4 m/min, the test time was 14 hours, and the oil temperature was 80° C. The criteria for judging whether it is acceptable or not were as follows: As for the ring abrasion depth, a value of 3 μm or lower is judged acceptable (Good), while a value higher than 3 μm was judged unacceptable (Poor). As for the abrasion depth of the sliding contacting material, a value of 2 μm or lower was judged acceptable (Good), while a value higher than 2 μm was judged unacceptable (Poor).

(5) Adhesive Strength [N]

Cup-shaped test pieces <1> simulating the housing were prepared by using the materials having the ratios of constituents shown in FIG. 8. The configuration and dimension are the same as the cup-shaped test pieces prepared for the test of (0) the ratio of the linear expansion coefficients. Bushes made of gunmetal were press-fitted onto the inner peripheries of the housing simulating test pieces <1> to prevent the deformation of the test pieces <1> when they were withdrawn, which will be described below. Meanwhile, bracket simulating test pieces <2> sizing ϕ20 mm×ϕ10 mm×10 mm were prepared from the materials shown in FIG. 8, and a hole whose inside diameter dimension was determined so that the adhesion gap between the test pieces <2> and the test pieces <1> was 25 μm in the diametrical gap was bored at the center of each of these test pieces <2>. The test pieces <1> and <2> were sufficiently degreased. As for the test pieces <1> according to the ratios of constituents Nos. 6 to 8 in FIG. 8, a primer was applied on their adhesion faces (the outer circumferential surfaces of the test pieces <1>). Moreover, an anaerobic adhesive was applied on the adhesion faces of all the test pieces <2> (the surfaces of the test pieces <2> which face the test pieces <1> when the test pieces <1> were inserted into the test pieces <2>). The test pieces <1> were then inserted into the test pieces <2>, and were cured with heating at 90° C. for one hour. "TB1359D" manufactured by Three Bond Co., Ltd. was used as the anaerobic adhesive, and "TB1390F" manufactured by Three Bond Co., Ltd. was used as the primer. Moreover, the amount of the anaerobic adhesive applied was about 10 mg, and the amount of the primer applied was about 1 mg (determined as an increase in the weight of the molded product after a solvent component has been evaporated). The test pieces <1> were then withdrawn from the test pieces <2>, the maximum load in withdrawing was considered as the adhesive strength. As the criteria for judging whether it is acceptable, a test piece having an adhesive strength higher than 1000 N was judged acceptable (Good), while that having an adhesive strength of 1000 N or lower was judged unacceptable (Poor).

In FIGS. 9 and 10, the evaluation results relating to the evaluation items (0) to (5) of each example product and comparative product are shown. If the ratio of the linear expansion coefficient of the linear expansion coefficient of the housing simulated of the test piece to the bracket simulating test piece is too low (lower than 0.5) as comparative products 1 and 2, sufficient adhesive strength cannot be obtained. Moreover, if the above ratio of the linear expansion coefficients is too high as comparative products 3 and 4 (higher than 2.0), sufficient adhesive strength cannot be obtained either. On the other hand, example products 1 to 8 according to the present invention showed excellent results in all the aspects including the adhesive strength, wear resistance (abrasion depth of the ring and contacting material), cleanliness (insolubility of ions) and the electrostatic removability (volume resistivity).

BRIEF DESCRIPTION OF DRAWINGS

FIG. 8 is a table showing the ratios of constituents of the materials used for example products and comparative products.

FIG. 9 is a table showing the test results of example products.

FIG. 10 is a table showing the test results of the comparative products.

Figure 1:
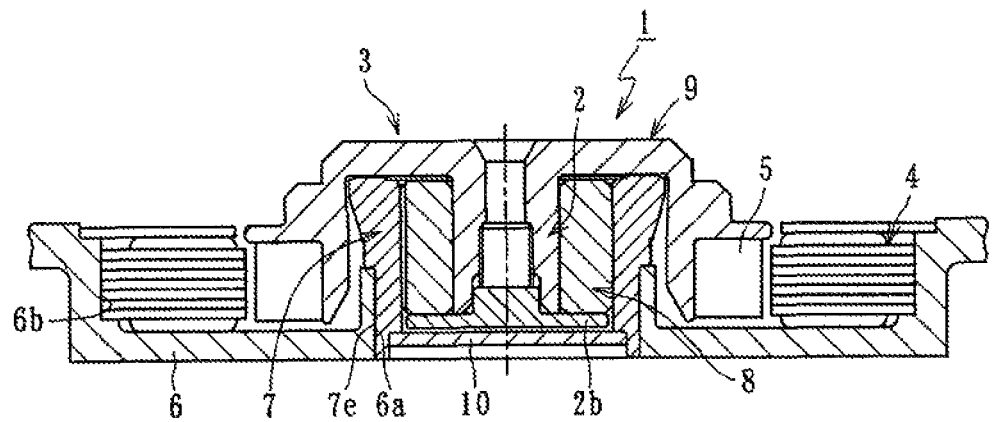
FIG. 1 is a cross-sectional view of a spindle motor integrating the fluid dynamic bearing apparatus according to the first embodiment of the present invention.
Figure 2:
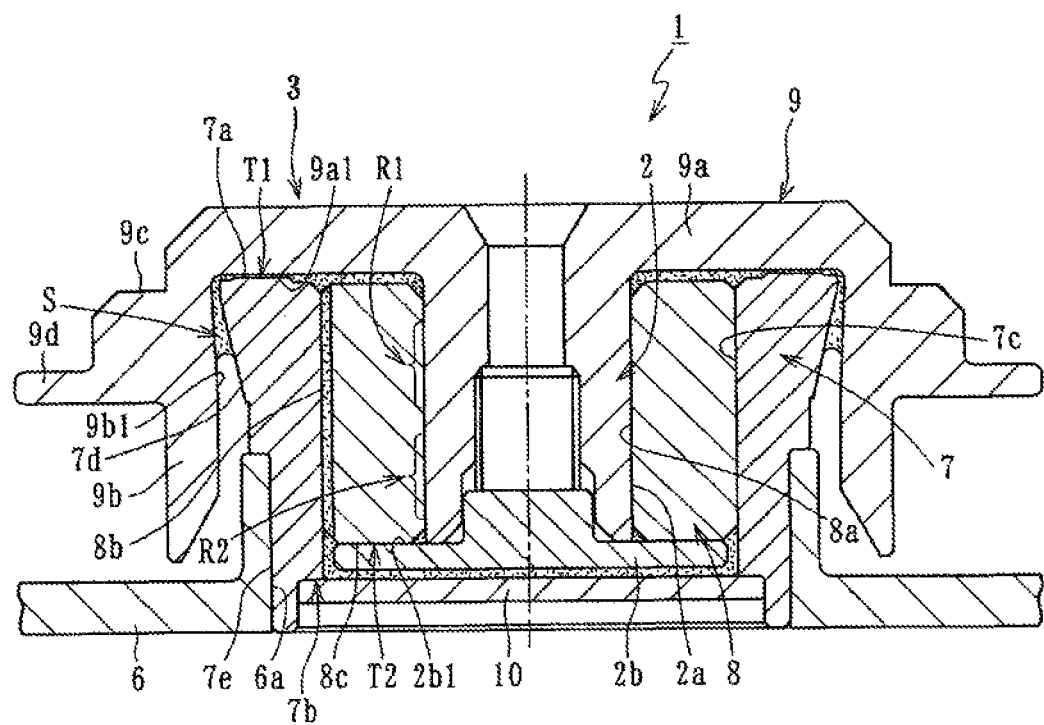
FIG. 2 is a cross-sectional view of the fluid dynamic bearing apparatus according to the first embodiment.
Figure 3:
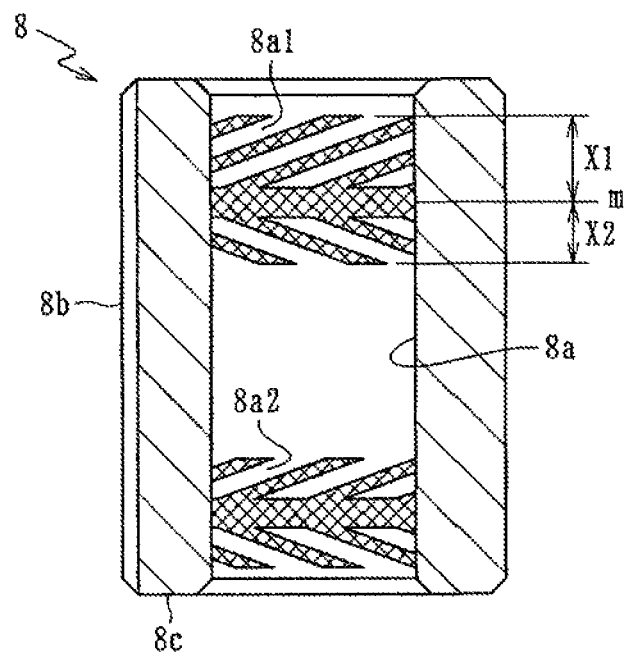
FIG. 3 is a cross-sectional view of the bearing sleeve.
Figure 4:
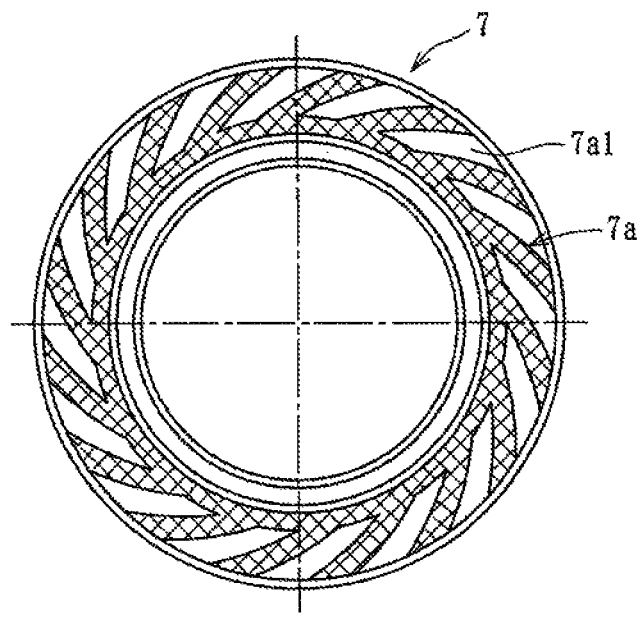
FIG. 4 shows the upper end face of the housing.
Figure 5:
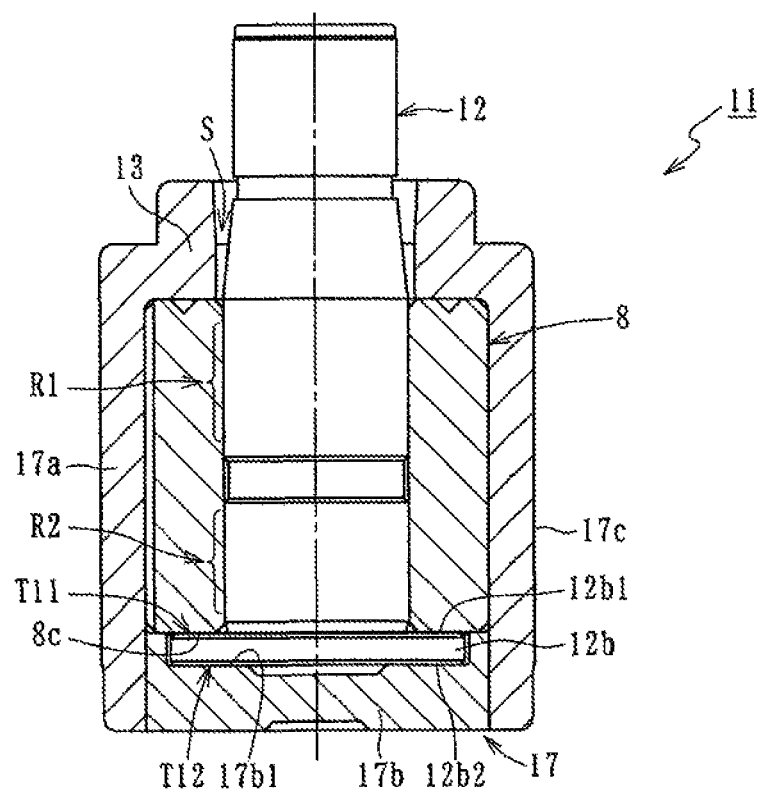
FIG. 5 is a cross-sectional view of the fluid dynamic bearing apparatus according to the second embodiment of the present invention.
Figure 6:
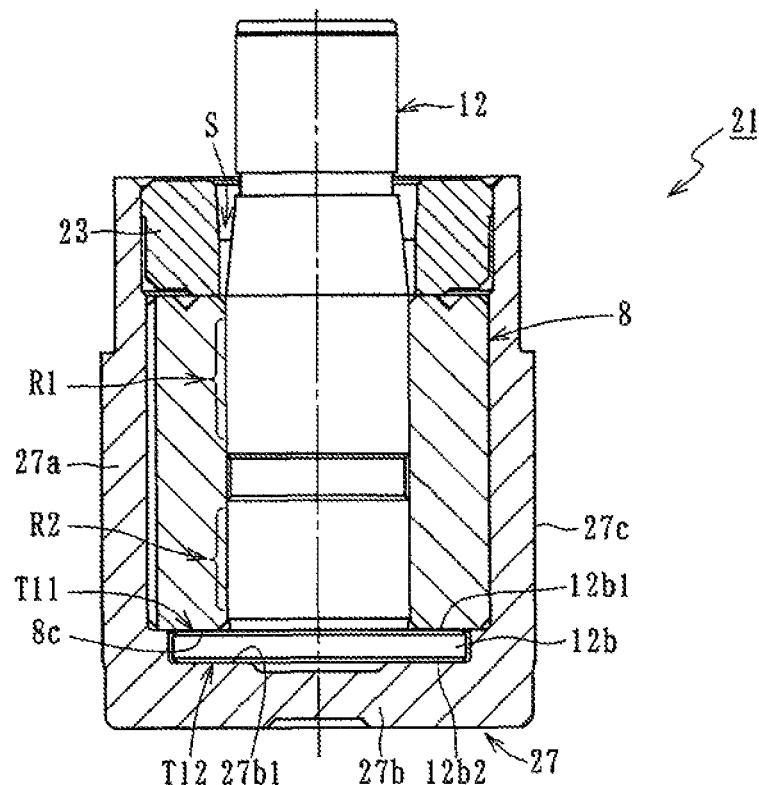
FIG. 6 is a cross-sectional view of the fluid dynamic bearing apparatus according to the third embodiment of the present invention.
Figure 7:
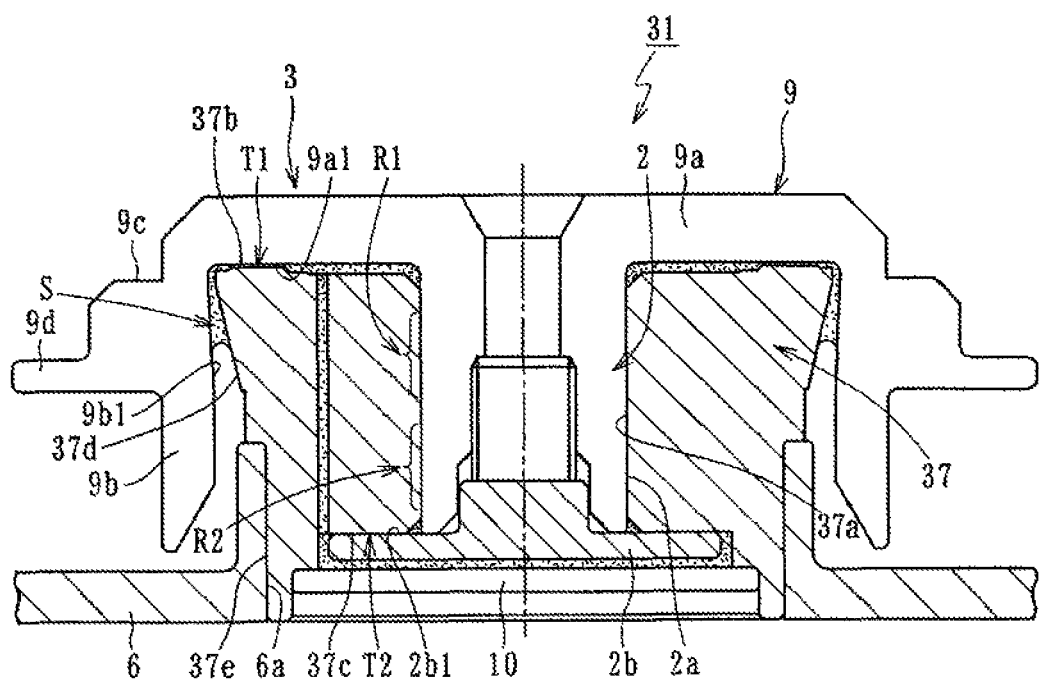
FIG. 7 is a cross-sectional view of the fluid dynamic bearing apparatus according to the fourth embodiment of the present invention.

The invention claimed is:

1. A method for producing a fluid dynamic bearing apparatus comprising a shaft member, a bracket, and a radial bearing portion which rotatably supports the shaft member in the radial direction by a fluid film formed in a radial bearing gap, and an adhesion fixing face which is fixed with gap adhesion to an inner circumferential surface of the bracket, the method comprising the steps of:

forming either (i) a component having an adhesion fixing face formed from a metallic material and a bracket formed from a resin composition including a base resin and fibrous fillers, or (ii) a component having an adhesion fixing face formed from a resin composition including a base resin and fibrous fillers and a bracket formed from a metallic material, defining an adhesion gap between the adhesion fixing face and the inner circumferential surface of the bracket by providing the component having the adhesion fixing face on an inner periphery of the bracket so that a width dimension of the adhesion gap, which is equal to a value obtained by subtracting a diameter of the adhesive fixing face from a diameter of the inner circumferential surface of the bracket, is not lower than 10 μm but not higher than 100 μm, filling the adhesion gap with an adhesive which is cured with heating, and fixing the component having the adhesion fixing face on the inner periphery of the bracket with the gap adhesion by curing the adhesive filling the adhesion gap, wherein a compounding ratio of the fibrous fillers in the resin composition is set such that a value, obtained by dividing a linear expansion coefficient of the component having the adhesion fixing face by a linear expansion coefficient of the bracket, is not lower than 0.5 but not higher than 2.0.

2. The method according to claim 1, wherein the component having the adhesion fixing face is formed from the metallic material and the bracket is formed from the resin composition including the base resin and fibrous fillers.

3. The method according to claim 1, wherein the component having the adhesion fixing face is formed from the resin composition including the base resin and fibrous fillers and the bracket is formed from the metallic material.

* * * * *